United States Patent
Wirthel et al.

(10) Patent No.: US 6,695,605 B1
(45) Date of Patent: Feb. 24, 2004

(54) FORMING STATION WITH A COMPARTMENTALIZED CHUTE

(75) Inventors: Rainer Wirthel, Griesheim (DE);
Walter Henschel, Otzberg (DE);
Ekkehard Brommer, Heidelberg (DE);
Guenther Denuel, Koenigsbrunn (DE);
Mario Seidel, Dinkelscherben (DE)

(73) Assignee: Dieffenbacher Schenck Panel GmbH, Pfungstadt (DE)

(*) Notice: Subject to any disclaimer, the term of this patent is extended or adjusted under 35 U.S.C. 154(b) by 0 days.

(21) Appl. No.: 09/958,776

(22) PCT Filed: Apr. 12, 2000

(86) PCT No.: PCT/EP00/03286
§ 371 (c)(1),
(2), (4) Date: Jan. 11, 2002

(87) PCT Pub. No.: WO00/61343
PCT Pub. Date: Oct. 19, 2000

(30) Foreign Application Priority Data

Apr. 12, 1999 (DE) .......................................... 199 16 447

(51) Int. Cl.⁷ .................................................. B27N 3/14
(52) U.S. Cl. ...................................... 425/83.1; 425/471
(58) Field of Search ............................... 425/80.1, 83.1, 425/471; 264/109; 198/382, 365, 569, 582

(56) References Cited

U.S. PATENT DOCUMENTS

| | | | |
|---|---|---|---|
| 3,737,265 A | * | 6/1973 | Schafer et al. .............. 425/140 |
| 4,359,151 A | | 11/1982 | Fyie et al. |
| 4,415,324 A | * | 11/1983 | Henckel et al. ............ 425/83.1 |
| 4,469,216 A | | 9/1984 | Haataja et al. |
| 4,931,243 A | | 6/1990 | Henschel et al. |
| 5,013,229 A | | 5/1991 | Ufermann et al. |
| 5,676,236 A | | 10/1997 | Barnes et al. |
| 5,887,515 A | | 3/1999 | Kunstmann |
| 5,922,254 A | | 7/1999 | Ebert et al. |

FOREIGN PATENT DOCUMENTS

| | | |
|---|---|---|
| DE | 7137773 | 10/1971 |
| DE | 1653340 | 1/1972 |
| DE | 3841276 | 5/1990 |
| DE | 19544866 | 6/1997 |
| EP | 0292581 | 11/1988 |
| EP | 0800901 | 10/1997 |
| EP | 0800902 | 10/1997 |
| JP | 10034615 | 2/1998 |

OTHER PUBLICATIONS

Firma Carl Schenck AG, Darmstadt, Germany, Company Prospectus, "Formstation"; SP 0208, issued Mar. 1985.

* cited by examiner

*Primary Examiner*—James P. Mackey
*Assistant Examiner*—Donald Heckenberg
(74) *Attorney, Agent, or Firm*—W. F. Fasse; W. G. Fasse

(57) ABSTRACT

Forming station with a metering or dosing hopper, out of which flowable materials, especially chip and/or fiber-form materials are delivered to a spreading apparatus, by which a material fleece is spreadable onto a forming belt, characterized in that a compartmentalized chute (2, 51) is provided vertically and longitudinally in the transport flow between the dosing hopper (1) and the forming belt (4, 53), wherein the compartmentalized chute consists of plural guide plates (9, 39, 40, 41, 54, 56, 57) which are arranged next to one another in the transport direction (36) and which divide the transport flow into plural partial flows (38, 55, 56) in the transport direction (36, 62, 76).

30 Claims, 13 Drawing Sheets

FORMING STATION WITH A COMPARTMENTALIZED CHUTE

FIELD OF THE INVENTION

The invention relates to a forming station for chip or fiber panel.

BACKGROUND INFORMATION

In the production of chip or fiber panels, flowable or free-flowing materials such as chips or fibers provided with a binder agents are discharged out of a dosing or metering hopper and delivered to a spreading head as a spreading apparatus, by means of a forming station. Through the spreading head, the chips or fibers are spread to form a fleece or mat onto a continuously running forming belt, and are then formed to a finished panel in a subsequent pressing station.

Such a forming station is previously known from the company prospectus "Forming Station", SP 0208, issued March 1985, by the company Carl Schenck AG in Darmstadt. Therein, the glued chip or fiber material is discharged out of the dosing or metering hopper over the entire width by means of discharge rolls, and is transported to a spreading head, in order to then be spread onto a forming belt. Spreading rolls of a certain width are generally arranged in the known spreading heads, whereby these spreading rolls distribute the chip or fiber fleece or mat to a certain width onto the forming belt. In practice, it is often necessary, however, to spread panels with varying widths on the same spreading station. Therefore, very often, the largest possible width of the fleece or mat is spread onto the forming belt, and then the excessively wide portion is uniformly removed on each side from the forming belt. The excess fleece material is then transported back into the dosing hopper via conveyor apparatus. Since the returned panel material is already provided with a binder agent, physical and/or chemical changes arise during the return transport, which disadvantageously influence the final quality of the panels.

A forming station with a spreading head is previously known from the DE GM 71 37 773, in which the width of the fleece to be spread-out is adjustable in the spreading head. For this purpose, slidable guide parts and adjustable side walls are provided below a return wiper rake in the spreading head, by means of which the spreading width can be reduced in a certain range. In this context, the guide parts are arranged vertically between a wiper rake and a dosing or metering belt and can be moved sideways toward one another or away from one another. Thereby, a pre-fleece or pre-mat can be formed on the dosing belt, whereby the width of this pre-fleece is adjustable by the sliding displacement of the guide parts. Thereby, the height of the pre-fleece is prescribed by the height of the guide parts. This pre-fleece is then dissolved or broken-up by a spreading roll and spread to a chip fleece on a forming belt arranged thereunder, whereby the spreading width is adapted to the width of the pre-fleece by means of adjustable side walls. Since the hopper walls are not also adjustable in connection with a belt width adjustment, first the dosing hopper must be emptied, before further spreading can be carried out with a smaller spreading width. Thereby it necessarily leads to a stopping or standstill of the forming station, which means an interruption of production.

SUMMARY OF THE INVENTION

It is therefore the object of the invention to provide a spreading station of which the spreading width is adjustable without production interruption and material return transport.

This object is achieved by the invention in a forming station comprising: a spreading apparatus, a forming belt, a dosing hopper out of which is transport flow of flowable materials including chip and fiber-form materials is delivered in a transport direction to the spreading apparatus, through which a material fleece of the flowable materials is spreadable onto the forming belt, and a compartmentalized chute arranged vertically and longitudinally in the transport flow between the dosing hopper and the forming belt, wherein the compartmentalized chute comprises plural guide plates which are arranged next to one another in the transport direction and are all respectively spaced apart from one another by spacing distances in a transverse direction that extends transversely relative to a longitudinal conveying direction of the forming belt, so as to form a respective compartment channel between each two adjacent ones of the guide plates, thereby dividing the transport flow in the transport direction into plural side-by-side partial flows respectively in the respective compartment channels. Further details and advantageous example embodiments are recited in the dependent claims.

The invention has the advantage, that basically any desired spreading widths can be adjusted by means of a simple varying of the spacing distances of the guide plates or sheets relative to each other. Thereby, in a simple manner, it is also possible to achieve an adaptation to differing widths of dosing hoppers, conveyor apparatus, spreading heads, and forming belts. Such a spreading width adjustment can advantageously also already be provided after the dosing hopper, so that the prescribed spreading width is already supplied to the following conveyor apparatus or the spreading head. Hereby, in a simple manner, the uniformity of the spreading can be improved, because the material flow is already supplyable to the spreading apparatus in the width that is to be spread-out.

The invention further has the advantage, by means of the adjustability of several adjacently located partial streams, that the material accumulation at the panel edges is reducible to a minimum by means of the division or distribution among several partial streams. In this manner, through simple measures, a material accumulation on the outer side edges is avoidable, which simultaneously leads to a uniform spreading.

A particular embodiment of the invention has the advantage that a very planar, even and uniform spreading of the chips or the fiber fleece is achieved by means of an inclined or sloping arrangement of the guide sheets or plates relative to the transport direction, because the accumulations overlap with the depressions directly under the guide plates due to the inclined arrangement. Hereby especially in the context of the spreading of fiber panels, it is advantageously usually no longer necessary to provide a subsequent height-adjustable equalizing roller. In a particular manner of embodying the invention, in which the compartmentalized chute is width-adjustable, the inclined positioning of the guide plates is achievable in an advantageous manner in that the compartmentalized chute is adjusted, for example, to be narrower or wider in the rear than in the front.

A further particular embodiment of the invention had the advantage that basically any desired spreading widths are adjustably settable by means of an automatic varying of the spacing distances of all of the guide plates relative to each other or entire groups of guide plates. Thereby, the spreading of a different panel width can be carried out, even during the operation, without production interruptions. The particular embodiment of the invention further has the advantage that a durable, problem-free adjusting operation is possible for many years by the mechanical adjusting means and the lever-like coupling, even though the most difficult environmental conditions prevail during the panel production due to considerable burdens of dust, heat and chemicals. Thereby, it is especially advantageous, by means of the lever-like coupling of the guide plates, all of the guide plates or groups of guide plates are adjustable by constant or differing adjustment distances in their total width, through a simple linear movement of a few lever arms.

BRIEF DESCRIPTION OF THE DRAWINGS

The invention will be described in greater detail in connection with an example embodiment which is shown in the drawing. It is shown in.

DETAILED DESCRIPTION OF PREFERRED EXAMPLE EMBODIMENTS OF THE INVENTION

Figure 1:
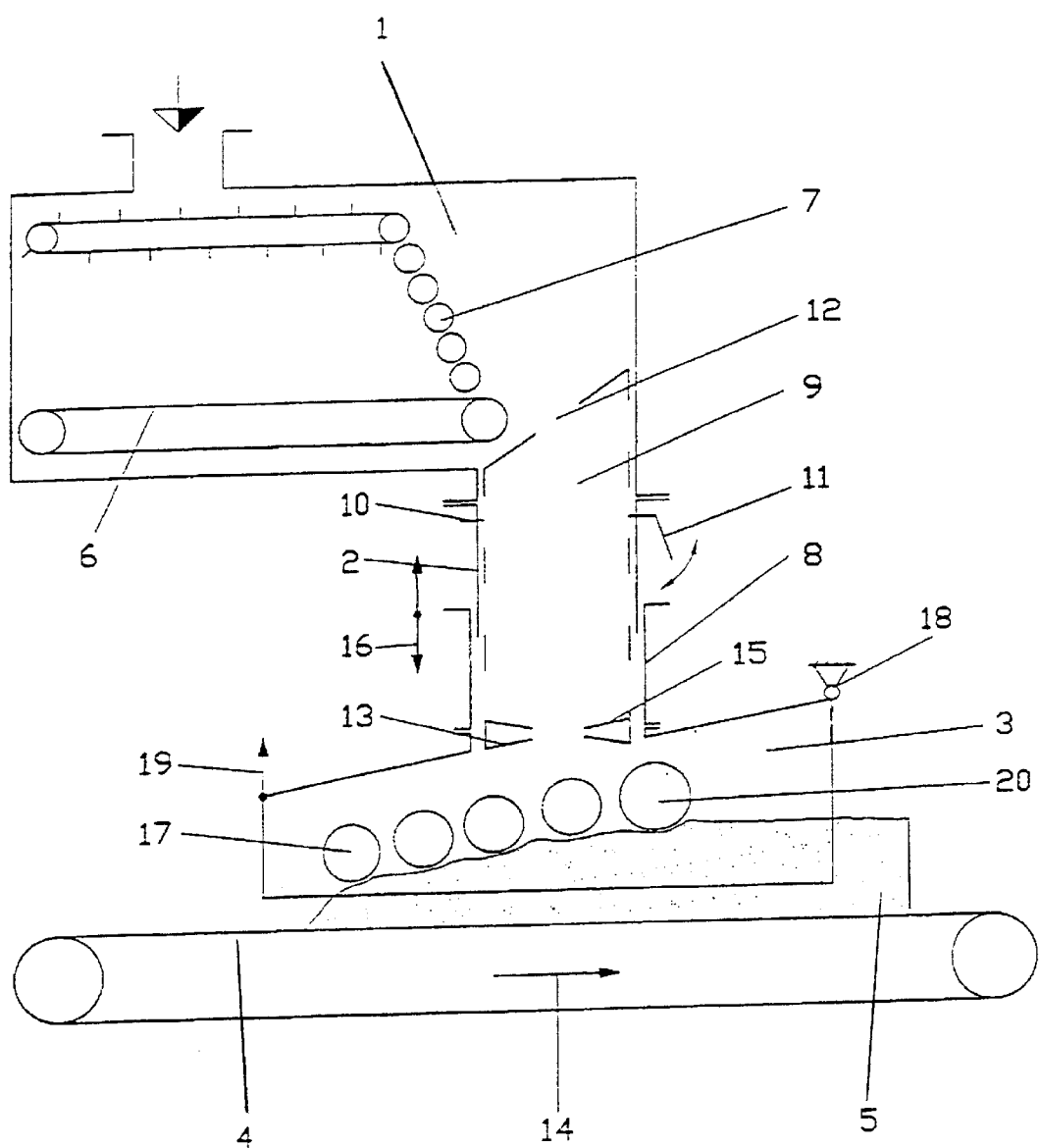
FIG. 1: a forming station with a compartmentalized chute between a metering or dosing hopper and a spreading head.

In FIG. 1 of the drawing there is shown a forming station with a dosing of metering hopper 1, a compartmentalized chute 2 with spreading width adjustment, a spreading apparatus 3, and a forming belt 4 onto which the material fleece or mat 5 of flowable spreadable material is to be spread.

The flowable spreadable material is intermediately stored in the dosing hopper 1 and is then distributed onto a provided discharge width and discharged downwardly over the entire width of the dosing hopper 1. Predominantly, lignocellulose and/or cellulose-containing particle of differing sizes such as fibers, chips and the like are provided as the flowable spreadable material. Mostly wood chips or wood fibers provided with a binder agent are used for the production of panels, whereby these wood chips or wood fibers provided with binder agent are continuously discharged out of the dosing hopper 1 with the aid of a floor belt 6 and discharge rollers 7. In this context, the dosing hopper 1 has a width, which at least corresponds to the maximum panel width that are to be produced on the apparatus.

The chips or fibers are discharged out of the dosing hopper 1, and over the entire width, they are spread onto the forming belt via conveyor and/or spreading apparatuses 3. However, in practice various different panels widths are also desired, which may be up to approx. 30% smaller than the largest possible panel width. Therefore, a width-adjustable compartmentalized chute 2 is arranged after the discharge out of the dosing hopper 1, whereby the chip or fiber material is delivered in the desired width through this compartmentalized chute 2 to the spreading apparatus, which is embodied as a spreading head 3.

The compartmentalized chute 2 consists of a rectangular housing part 8 in which plural parallel guide plates or sheets 9 are arranged. The guide plates 9 are oriented longitudinally relative to the transport direction, and are spaced apart from one another in a transverse direction so as to form compartment channels respectively between neighboring ones of the guide plates, so as to divide the transport flow into plural parallel flows. Thereby, plural relatively uniform partial flows result, which are individually influenceable in order to achieve an optimal distribution on the forming belt 4. In order to achieve such an influence especially in the width, there shall be provided at least so many guide plates 9 so that at least three partial flows result. Since in practice panel widths up to approximately 3 to 4 m are typical, compartmentalized chutes 2 of approximately eight to thirty parallel flows have been shown to be advantageous. For this purpose, the compartmentalized chute 2 according to FIG. 1 contains approximately 9 to 31 parallel arranged guide plates 9, which are oriented in the direction of the transport flow. The transport direction in this context is vertical, in order to transport or convey the material particles from the upwardly lying dosing hopper 1 onto the spreading head 3 arranged thereunder. The compartmentalized chute 2 may, however, also be arranged inclined or sloped relative to the vertical direction, in order to simultaneously achieve a horizontal conveying or transporting component. The compartmentalized chute may simultaneously also be oriented at an incline or slope relative to the transport direction in order to also laterally deflect the transport flow.

The guide plates 9 are secured so as to be tiltable or slidable relative to a location-fixed housing part 8, so that the spacing distances of the guide plates 9 from one another are adjustable continuously or step-wise. Thereby the partial flows are changeable in the width, at least at the material outlet location out of the compartmentalized chute 2.

According to FIG. 1 of the drawing, the guide plates 9 are pivotably suspended at their upper area 10, and are individually pivotable relative to the vertical by means of a schematically illustrated lever arm 11. By means of interconnection of plural pivot levers 11, respectively one part of the guide plates 9 can be pivoted toward the middle, so that thereby the width of the transport flow is reduced uniformly over the entire width, or with different adjustment angles.

However, the guide plates 9 may also be arranged so as to be transversely slidable, so that by means of a lateral sliding displacement of the metal plates 9 at least in the area of the material outlet location, the transport width is continuously or discontinuously changeable. Thereby, it is predominantly achieved that in connection with a reduction of the transport width, the transport flow is influenceable also over the entire width and not only at the edge areas.

The guide plates 9 are embodied at flat one-piece metal sheets or plates, which are cut at an incline or sloped-off relative to the horizontal, both at the top in the area of the material discharge location of the compartmentalized chute 2 as well as the bottom at the material outlet location. In the upper area, the inclined cut or edge 12 serves to improve the division into the partial flows and therewith the prevention of material accumulations. These inclined edges 12 may be respectively different both in the angle, as well as in the height of the guide plates 9, in order to improve the continuous material flow. The inclined edge 12 can be embodied to be straight, curved, sawtooth-shaped and/or in shapes derived therefrom. For easily flowable spreadable materials, the guide plates 9 may, however, also be right-angled or quadratic.

The bottom slope or incline 13 of the guide plates 9 can be either falling off or rising in the transport direction. For easily sticking or agglomerating and fibrous spreadable materials, an alternating inclined edge 13, 15 of the neighboring guide plates 9 has been determined to be advantageous, in order to avoid a sticking onto the lower edge 13, 15 and to achieve a continuous uniform transport flow. The lower incline or slope 13, 15 of the guide plates 9 can be embodied, depending on the characteristics of the spreadable material, as a straight edge with various rise or slope angles, as a curved edge, as a sawtooth-shaped edge, and/or in shapes derived therefrom. The guide plates 9 may also be coupled with vibration generators or exciters so that they can be set into vibration with a prescribed amplitude transversely relative to the transport direction, whereby material sticking onto the plates 9 can be avoided.

The housing 8 of the compartmentalized chute 2 is embodied in the manner of a telescope, so that the compartmentalized chute 2 is also adjustable in the lengthwise direction 16, i.e. vertically. This is advantageous in connection with height-adjustable spreading heads 3, which are preferably used for the spreading of MDF panels (medium density fiber board panels) and HDG panels (high density fiber board panels). For larger spreading height changes, also the guide plates 9 can be embodied in the manner of a telescope, so as to also adapt these to the changed spreading height.

As a spreading apparatus, a spreading head 3 with plural spreading rollers 17 arranged parallel and transversely or crosswise relative to the transport direction 14, is secured below the compartmentalized chute 2. The spreading rollers 17 are arranged in a horizontally rising line longitudinally relative to the transport direction 14, in order to ensure a uniform spreading and a height limiting. Thereby, the spreading rollers 17 are provided directly below the compartmentalized chute 2, and transport the flowable materials, preferably the glued wood fibers, against or contrary to the transport direction 14. Through the rotation of the spreading rollers 17, the wood fibers are simultaneously spread in the form of a fiber fleece or met 5 onto the forming belt 4 that runs continuously under the spreading rollers 17, and are delivered to a subsequent pre-pressing station or to a panel press.

Since the spreading rollers 17 essentially only spread out the material which is deposited onto the top of the spreading rollers 17, they also essentially only spread in the width, in which the transport flow is prescribed through the compartmentalized chute. Such a spreading station 3 is predominantly provided for spreading a fiber fleece or mat for HDG and MDF panels of which the spreading heights can vary from approx. 6 to 160 cm. Therefore, the spreading head 3 is arranged height adjustably. The spreading head 3 is supported at a fixed-location rotation point 18 and is adjusted in height in a simple manner by means of a stroke device 19 that is not illustrated in detail. For larger stroke ranges, a parallel-type four point height adjustment is also possible.

Additionally, two return wiping or striking rollers 20 are provided in the transport direction 14 before or in front of the spreading rollers 17. The return wiping rollers 20 limit and equalize the fiber fleece or mat 5 in a prescribed spreading height. Also this height is changeable by the pivoting displacement of the spreading head 3.

Figure 2:
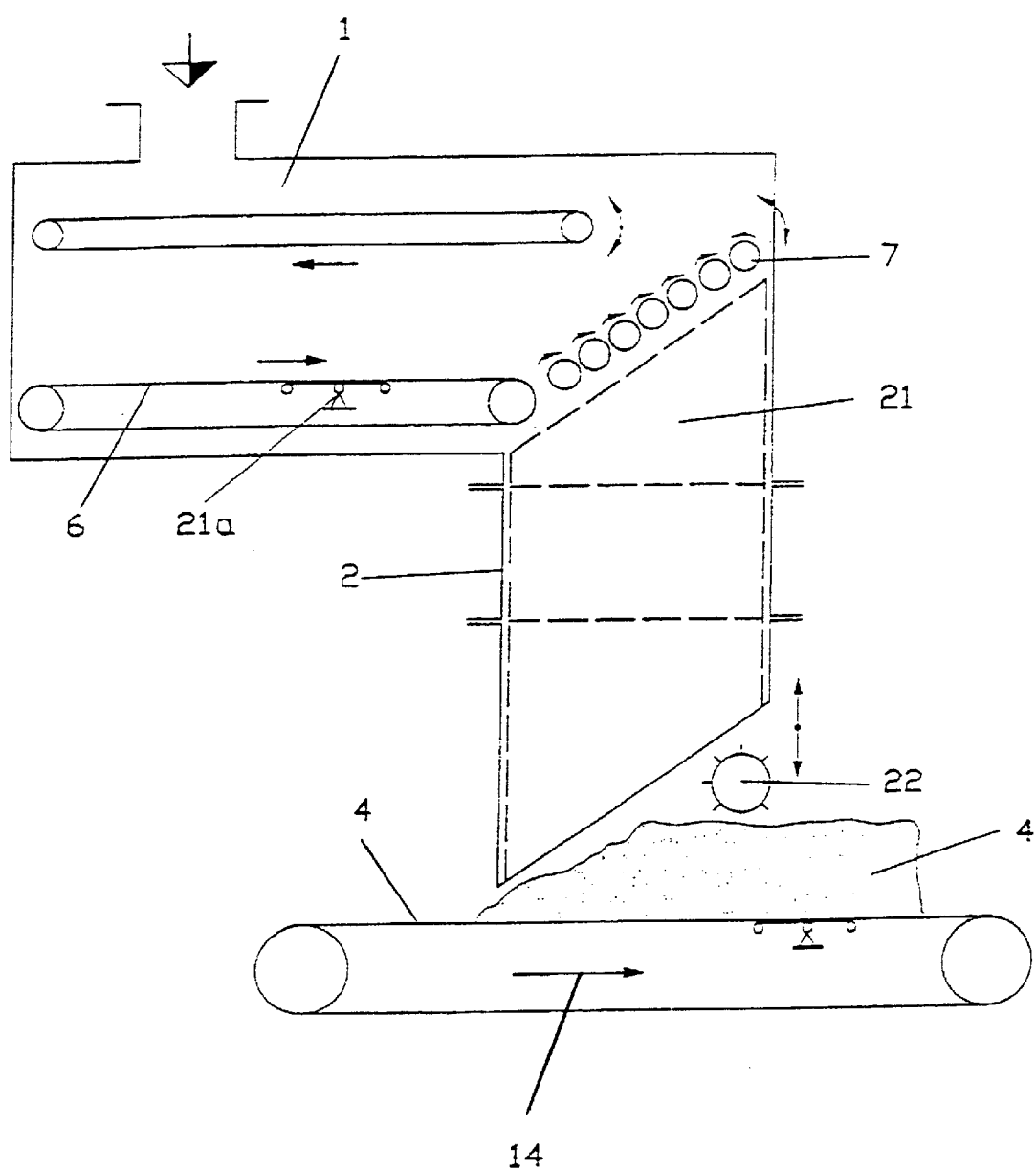
FIG. 2: a forming station with a compartmentalized chute between a dosing hopper and a forming belt.

FIG. 2 of the drawing shows a spreading station, especially for spreading glued wood fibers for HDG and MDF panels. Thereby the compartmentalized chute 2 is embodied as both a conveyor or transporting apparatus as well as a spreading apparatus, through which the fiber fleece or mat 5 is directly applied onto the forming belt 4. For this purpose, the discharge rollers 7 located in the dosing hopper 1 are adjustable in both their rotational speed as well as the adjustment angle. Since simultaneously a belt scale 21a is further integrated into the floor belt 6, the discharge transport rate may be exactly controlled, so that a prescribed spread mass is directly spreadable onto the forming belt 4. The belt scale can also be integrated into the forming belt, in order to weigh the spreading quantity on the forming belt 4. In this context, the compartmentalized chute 2 is adjustable in height, by means of telescope-like guide plates 21, so that hereby, also in a simple manner, large fiber height ranges of approximately 6 to 160 cm are spreadable. Thereby, the guide plates 21 are embodied in a three-part manner, and make it possible to achieve a clean vertical edge spreading especially by means of a parallel adjustment or setting in the area of the forming belt 4, and this in connection with a variable width adjustment. Additionally, thereby is still provided a return wiping or striking roller 22, which is adjustable in such a manner so that the prescribed fiber fleece or mat surface is uniformalized.

Figure 3:
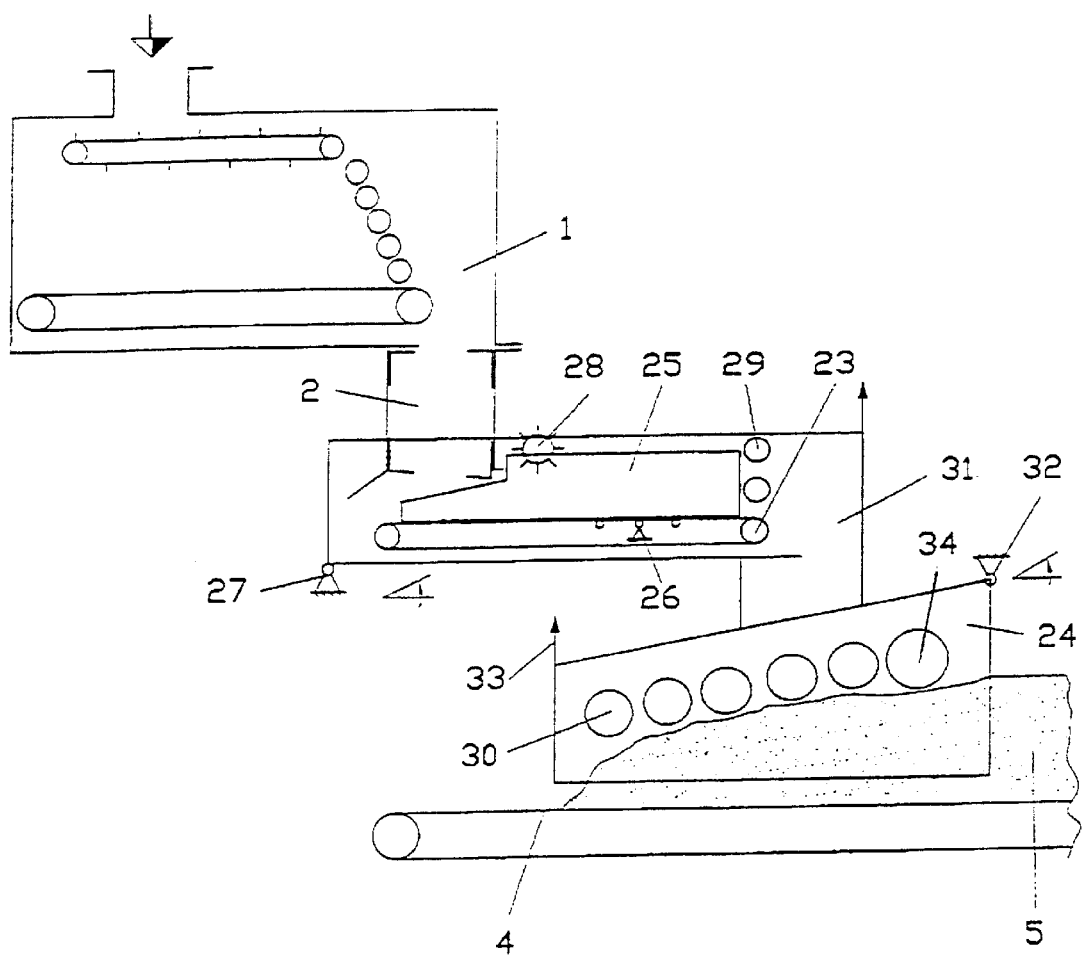
FIG. 3: a forming station with a compartmentalized chute between a dosing hopper and a metering or dosing belt scale.

In FIG. 3 of the drawing, the compartmentalized chute 2 is between the dosing hopper 1 and an additional conveyor or transport device 23, which delivers are spreadable material to a spreading head 24. In this context, the additional conveyor or transport device 23 is embodied as a metering or dosing belt scale, which continuously transports a regulatable transport quantity into the spreading head 24, so that a prescribable quantity is spread onto the forming belt 4 from the spreading head 24, depending on the panel thickness and width. For this purpose the compartmentalized chute 2 is arranged under the dosing hopper and is adjustable in the transport width, as according to FIGS. 1 and 2. The compartmentalized chute 2 transports directly onto the continuously drive dosing belt scale 23. In this context, the dosing belt scale 23 is provided in a width, which corresponds at least to the maximum spreading width. The dosing belt scale 23 is limited in its width by side walls 25 at each outer edge, whereby these side walls 25 are embodied to be adjustable corresponding to the spreading width. Thereby the width adjustment of the side walls 25 follows the width adjustment of the compartmentalized chute 2, in that the side walls 25 are movable toward one another or apart from one another. Thereby, clean side edges are already spread onto the dosing belt scale 23, which make it possible to achieve an exact width spreading onto the forming belt 4. Thereby an exact control of the spreading quantity is possible by means of the weighing device 26, whereby the spreading quantity corresponds to the desired panel thickness and width. Especially, a rapid transport rate change can be achieved already before the spreading-out of the material, by means of the dosing belt scale 23 located before or in front of the spreading head 24, insofar as the material density or composition changes, so that a prescribed fleece or mat weight can be exactly maintained.

The additional dosing belt scale 23 is rotatably supported on one side by means of a bearing element 27, so as to embody the transport height in an adjustable manner in connection with large spreading height differences, for example in the production of wood fiber panels. The transport flow is additionally uniformalized by a height-adjustable equalizing roller 28. Two further spreading rollers 29, which transport the spreadable material onto a spreading head 24 arranged thereunder, are provided at the end of the additional transport or conveyor device 23.

The spreading head 24 includes plural spreading rollers 30, which are arranged transversely or crosswise, and which spread the spreadable material in a prescribed height and width onto the forming belt 4 running thereunder. The prescribed width is already largely defined by the supplied material width on the dosing belt scale 23, which was prescribed by the compartmentalized chute 2. Since the vertical conveyor shaft 31 oriented to the spreading head 24 is dimensioned to the maximum spreading width, lateral metal plates or sheets that are adjustable in their width could be provided therein, so that the transport width would also thereby be adjustable to the desired spreading width.

The spreading head 24 is rotatably supported on an upper bearing element 32, so that it is adjustable in its height by a stroke mechanism 33 which is not illustrated. Thereby, especially, an exact spreading height adjustment is controllable, which is advantageous in connection with the spreading of fiber panels. Thus, a provided material fleece or mat height is exactly spreadable by means of a provided return wiping or striking roller 34, insofar as the spreading head 24 is correspondingly adjusted in its height. The spread-out fiber fleece or mat 5 is then delivered by the continuously running forming belt 4 to a subsequent pre-press or panel press.

Figure 4:
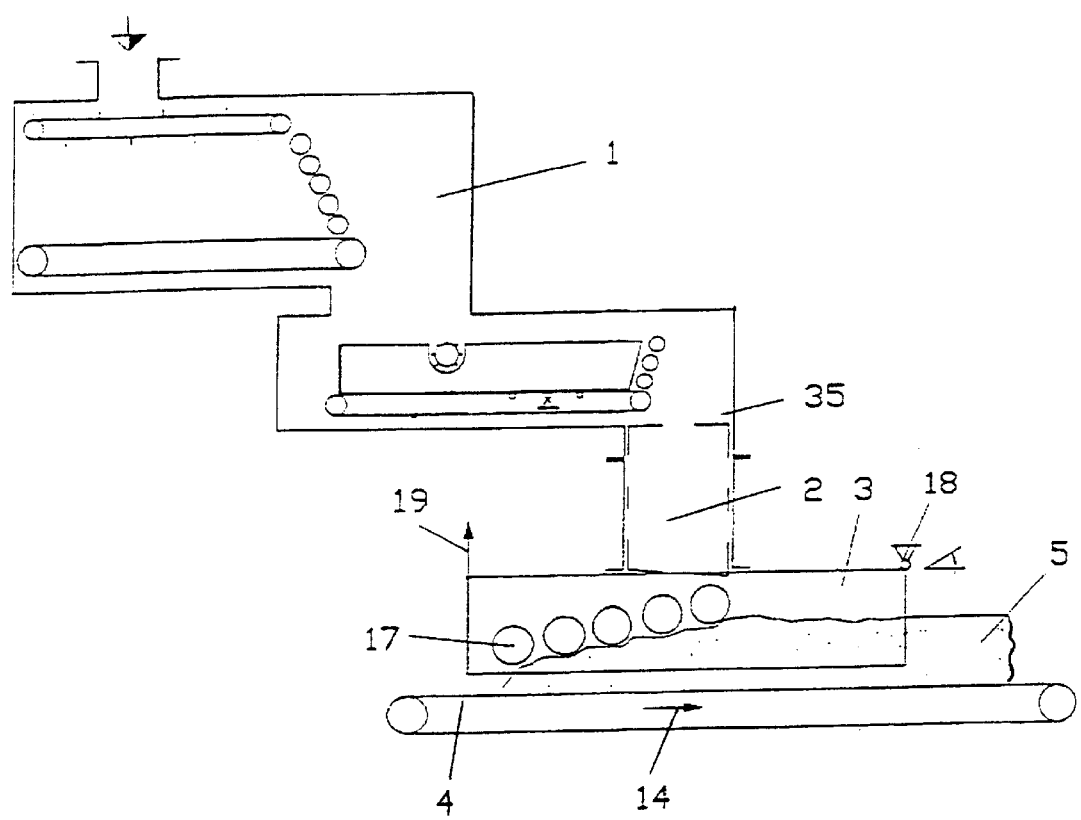
FIG. 4: a forming station with a compartmentalized chute between a dosing belt scale and a spreading head.

FIG. 4 shows a spreading station in which a dosing belt scale 23 is arranged below the dosing hopper 1, and a compartmentalized chute 2 is provided at the outlet opening 35 of the dosing belt scale 23. The compartmentalized chute 2 delivers the transport flow in a predefined width to a spreading head 3 as a spreading apparatus. The dosing hopper 1 and the dosing belt scale 23 correspond to the components described in connection with FIG. 3. However, here the compartmentalized chute 2 is provided vertically between the dosing belt scale 23 and above the spreading head 3. Hereby, the compartmentalized chute 2 is comparably embodied as that already described in connection with FIG. 1. During the course of operation, the flowable materials, such as especially glued wood fibers, are transported in the form of plural parallel flows through the compartmentalized chute 2 into the spreading head 3. By means of the spreading rollers 17 arranged parallel next to one another transversely or crosswise relative to the transport direction 14, a fiber fleece or mat 5 is spread with a prescribed width onto the forming belt 4, and transported to a pre-press or panel press. The spreading head 3 is rotatably supported on one side by means of a rotational bearing element 18, so that it is adjustable in its height by means of a stroke device 19 that is not illustrated.

Figure 5:
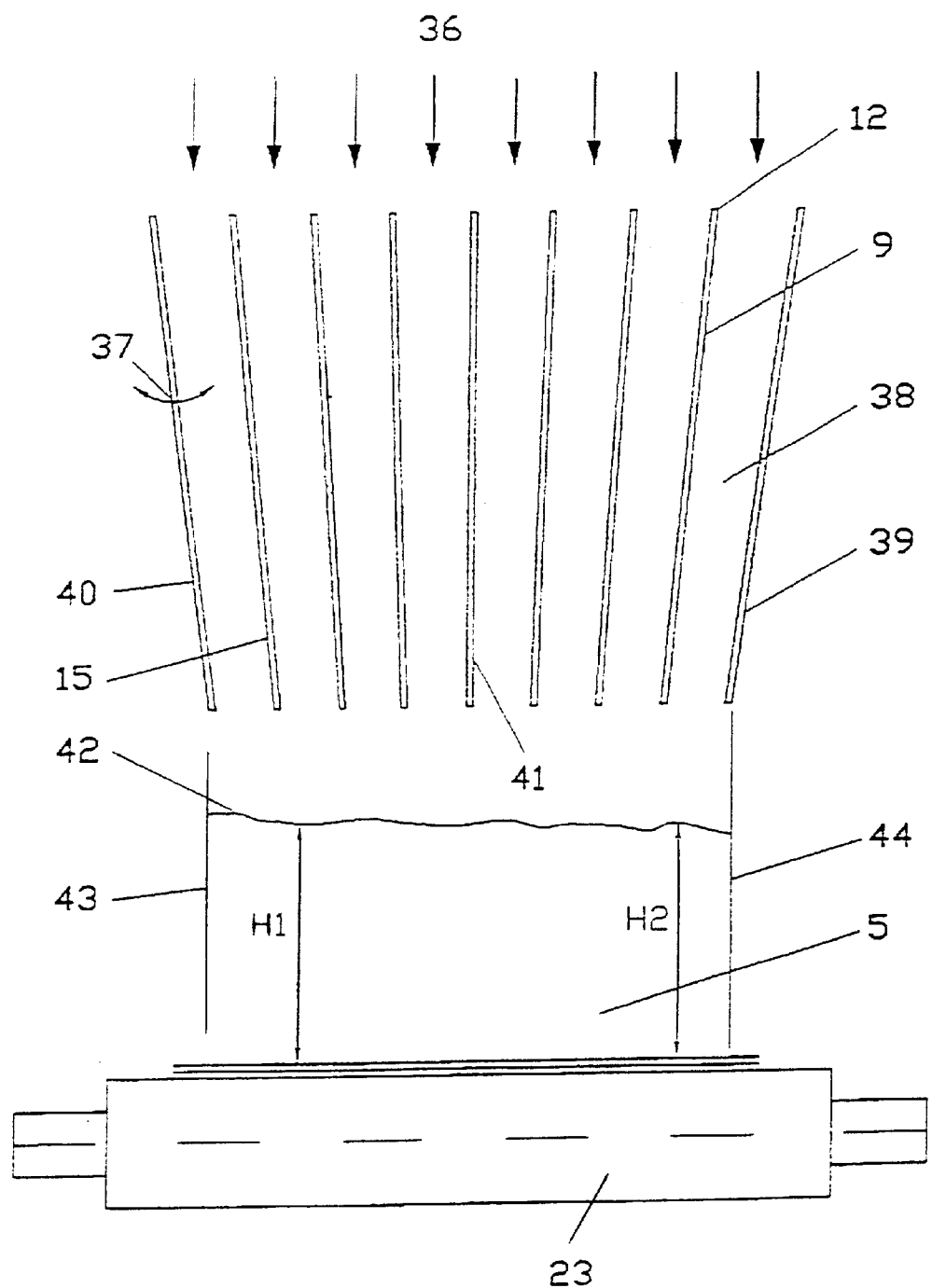
FIG. 5: a sectional view of the compartmentalized chute for a spreading width reduction.

A compartmentalized chute 2 is illustrated as a sectional view in FIG. 5 of the drawing. Thereby, the upper arrows 36 schematically represent the material supply in the transport direction, while a belt scale 23 as a transport or conveyor apparatus is located under the compartmentalized chute 2. The compartmentalized chute 2 essentially consists of several parallel arranged guide plates 9, which all extend in the transport direction 36. The guide plates 9 are pivotally suspended in the upper area 37, so that they are adjustable individually or in groups. In connection with longer compartmentalized chutes 2, the guide plates 9 can also be connected by plural bearing points 37 with a location-fixed housing 8 or frame member. The guide plates 9 can also be laterally slidably arranged, so as to change the spacing distances between each other in a step-less manner or in prescribed steps.

In FIG. 5 of the drawing, nine guide plates 9 are provided. In practice, nine to thirty guide plates have been shown to be advantageous for transport widths up to approx. 3 to 4 m. In an individual case, for example, for spreading chip panels, it is also possible to provide up to fifty guide plates 9. The illustrated compartmentalized chute 2 is conceived and designed in such a manner so that all of the guide plates 9 are oriented parallel to each other at the maximum transport width, so that the total material flow is divided into approximately eight equally large partial flows 38. Since in practice, spreading width changes of up to approx. 30% can be necessary, the two edge guide plates 39, 40 must be adjustable inwardly up to approx. 60 cm. For this reason, the two guide plate groups respectively on opposite sides of the middle guide plate 41 are tiltable relative to the middle guide plate 41, in order to adjust the transport width corresponding to the desired panel width. Thereby, it has been shown to be advantageous in practice, that all of the guide plates are tiltingly or slidingly displaced in such a manner so that equal spacing distances of the guide plates 9 relative to each other arise at the material outlet location, in order to achieve a relatively equal material distribution over the entire width. By such a width adjustment, a uniform material distribution 42 onto the conveyor belt 23 is achieved, which leads to a continuous panel quality over the entire width. The guide plates 9, 39, 40, 41 may, however, also be arranged in such a manner so that they are not only slidable inwardly, but rather also or only outwardly. This can be advantageous is wider panels are to be spread from a relatively narrow dosing hopper 1.

The guide plates 39, 40 on the two side edges are connected with side walls 43, 44 extending to the conveyor belt 23, whereby these side walls 43, 44 are synchronously slidable with the guide plates 39, 40. Thereby, a clean termination edge is formed, especially in connection with large spreading heights 42 of approx. up to 2 m. This makes an exact spreading width on the forming belt 4 possible. This is advantageous especially when the transport is directly onto the forming belt 4 corresponding to the embodiments according to FIG. 2 of the drawing.

The guide plates 9, 39, 40, 41 are embodied as flat straight metal sheets or plates, which are fabricated from a thin steel sheet or plate. The metal plates 9, 39, 40, 41 may, however, also have a corrugated metal sheet structure transversely or crosswise relative to the longitudinal or transport direction 36, in order to achieve a longitudinal guiding function especially in inclined or sloping compartmentalized chutes 2. The structure may, however, also comprise a zig-zag shaped, angular, or other shape derived therefrom, which all additionally provide stabilizing functions in the lengthwise direction. The guide plates 9, 39, 40, 41 can be hardened or provided with harder surface coatings on their contact surfaces, in order to reduce wear. Thus, guide plates of other metals, plastics, or composites are also useable. The surface, however, can also be provided with adhesion resistant surface coatings of plastic or comparable materials, in order to especially avoid the adhesion of dirt or binder agent. The guide plates 9 may, however, also be coupled with a vibration generator or exciter, which releases or prevents adhesions or contaminations.

The guide plates 9, 39, 40, 41 are rectangular and equally long in the longitudinal direction 36. In the feeding and outlet areas, inclined or slopingly arranged edges 12, 13, 15 have also been shown to be advantageous. Thereby, especially, material jams or blockages in the feed area and in the outlet area of the compartmentalized chute 2 are effectively avoided. These feed edges 12 and outlet edges 13, 15 can also be embodied sawtooth-shaped, curved, or with a form derived therefrom. Thus, it has also been shown to be advantageous, especially in the outlet area, to embody the length of the guide plates to differ, in order to make it possible to achieve a good breaking or separating behavior, whereby a continuous material flow is ensured.

Figure 6:
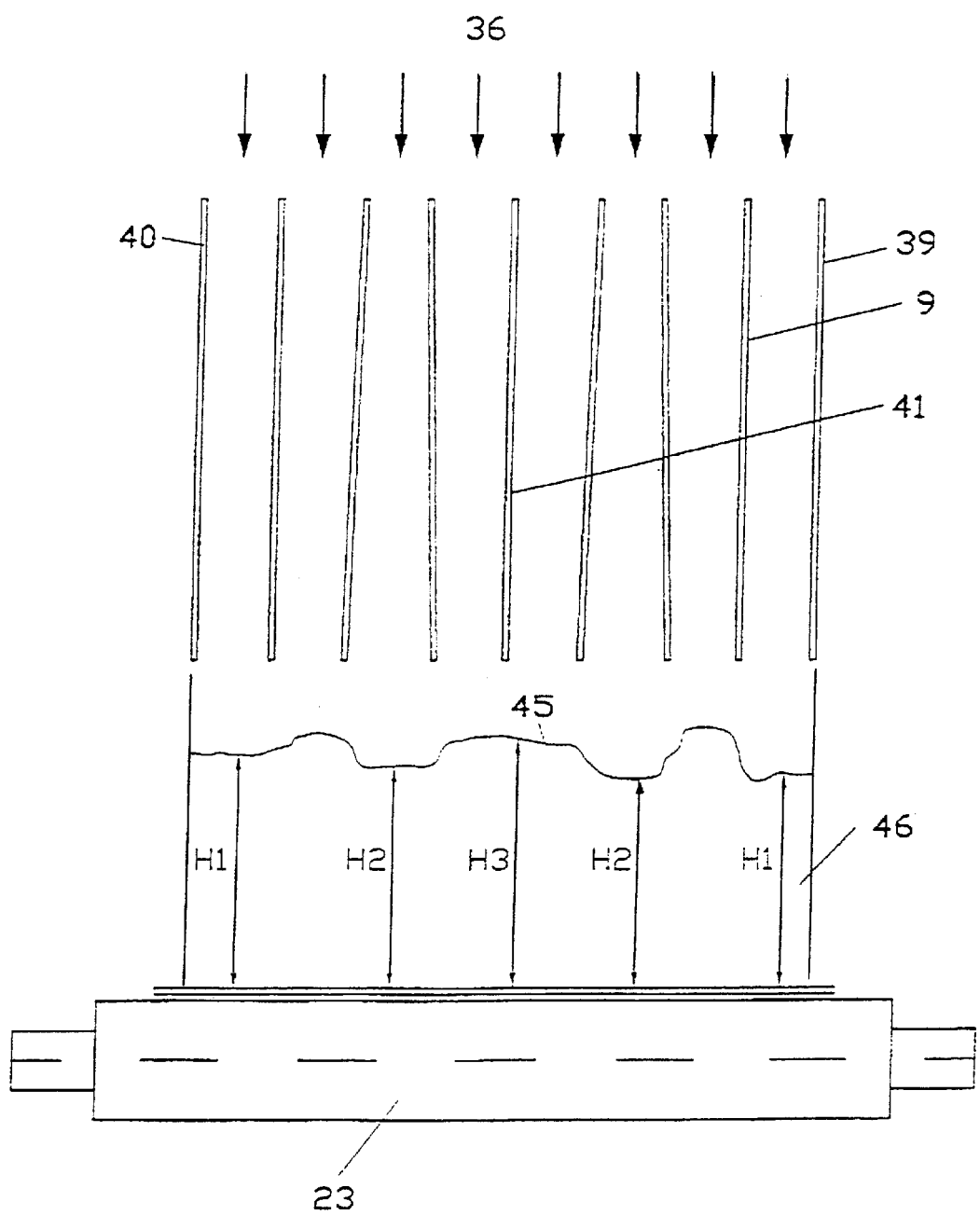
FIG. 6: a sectional view of the compartmentalized chute for a spreading profile adaptation.

A further embodiment is shown in FIG. 6 of the drawing, according to which all of the guide plates 9, 39, 40, 41 are orientable laterally independently from each other. Thereby, each guide plate 9, 39, 40, 41 is individually controllable by means of its own pivot drive 11 or sliding drive, so that especially a prescribed height profile 45 with different material heights 46 can be laid down onto the conveyor belt 23 or the forming belt 4. This is always advantageous when panels having varying densities or profiles are to be produced. Therewith it is also possible to carry out an adaptation to certain press characteristics of the subsequent pressing station. Moreover, with such an individual orienting, it is also possible to control a simultaneous one-sided lateral deflection of the transport flow.

Figure 7:
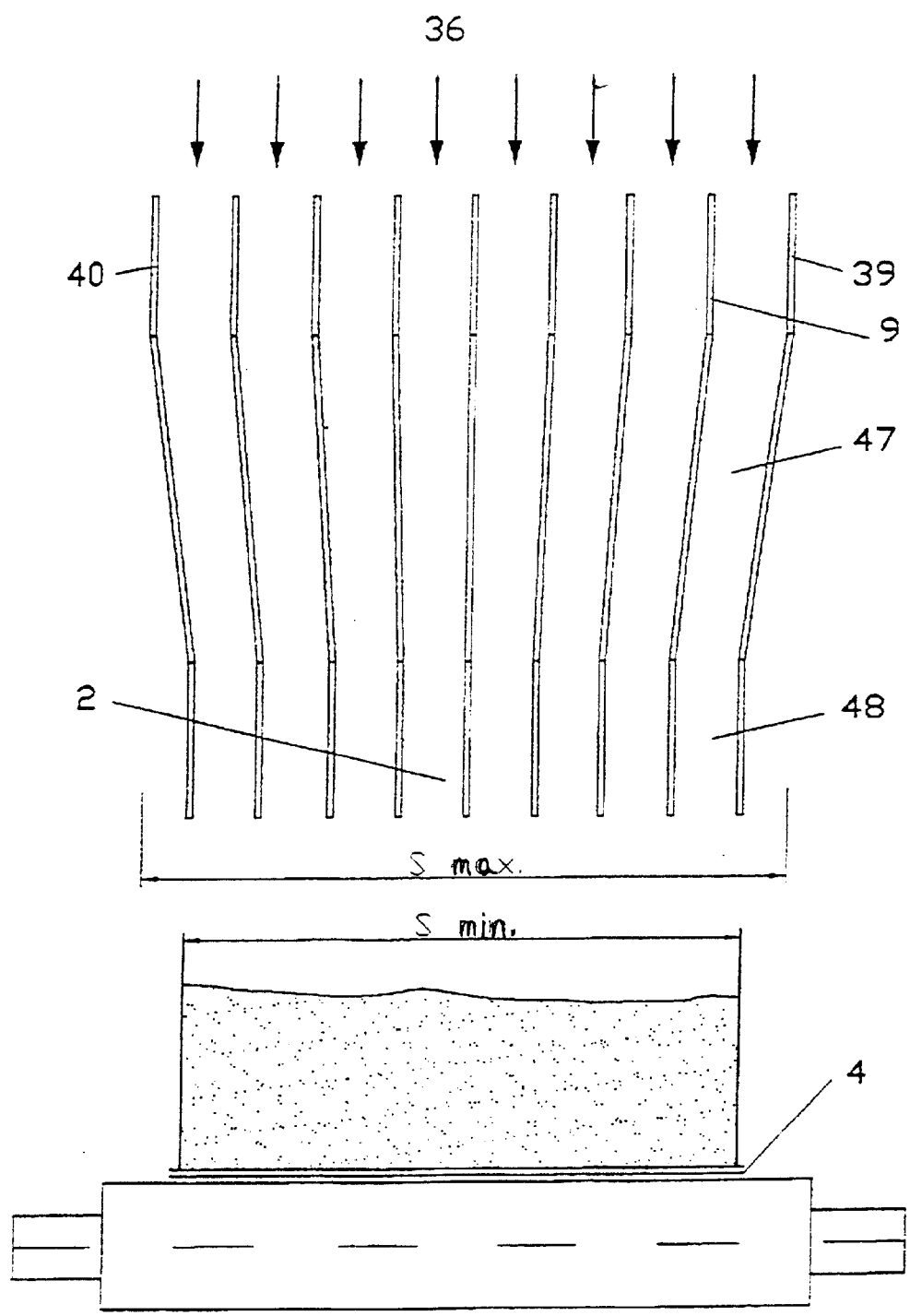
FIG. 7: a sectional view of the compartmentalized chute with three-part guide plates.

In FIG. 7 of the drawing, a compartmentalized chute 2 with guide plates 9, 39, 40 having three parts in the longitudinal direction and being articulately or jointedly connected with each other, is illustrated. This guide plate arrangement achieves a cross-sectional area variation only in the middle area 47, so that a good material flow is achievable, especially in the transition areas subject to the danger of plugging or blockage. Simultaneously hereby, there is achieved in the outlet area 48, a vertical material discharge, which ensures a clean edge formation on the forming belt 4 or the conveyor belt 23 lying thereunder. The guide plates 9, 39, 40 can also consist of more than three guide plate parts, so that also rounded-off material constrictions are controllable. Instead of the multi-part guide plates, flexible guide plates can also be utilized, which effect a continuous material transport in the transport direction 36. The guide plates can also be embodied telescope-like in their length, so that the compartmentalized chute 2 is also adjustable in the length, which is especially advantageous in connection with differing spreading heights.

In a special embodiment of the compartmentalized chute 2, the compartmentalized chute can also be embodied in such a manner that it would be adapted to only one single prescribed width reduction or enlargement. For this purpose, the guide plates 9 would have to be rigidly arranged in the housing or frame member. Thereby in a simple manner it would be possible to provide a prescribed adaptation to a single fixed transport or spreading width adjustment.

Figure 8:
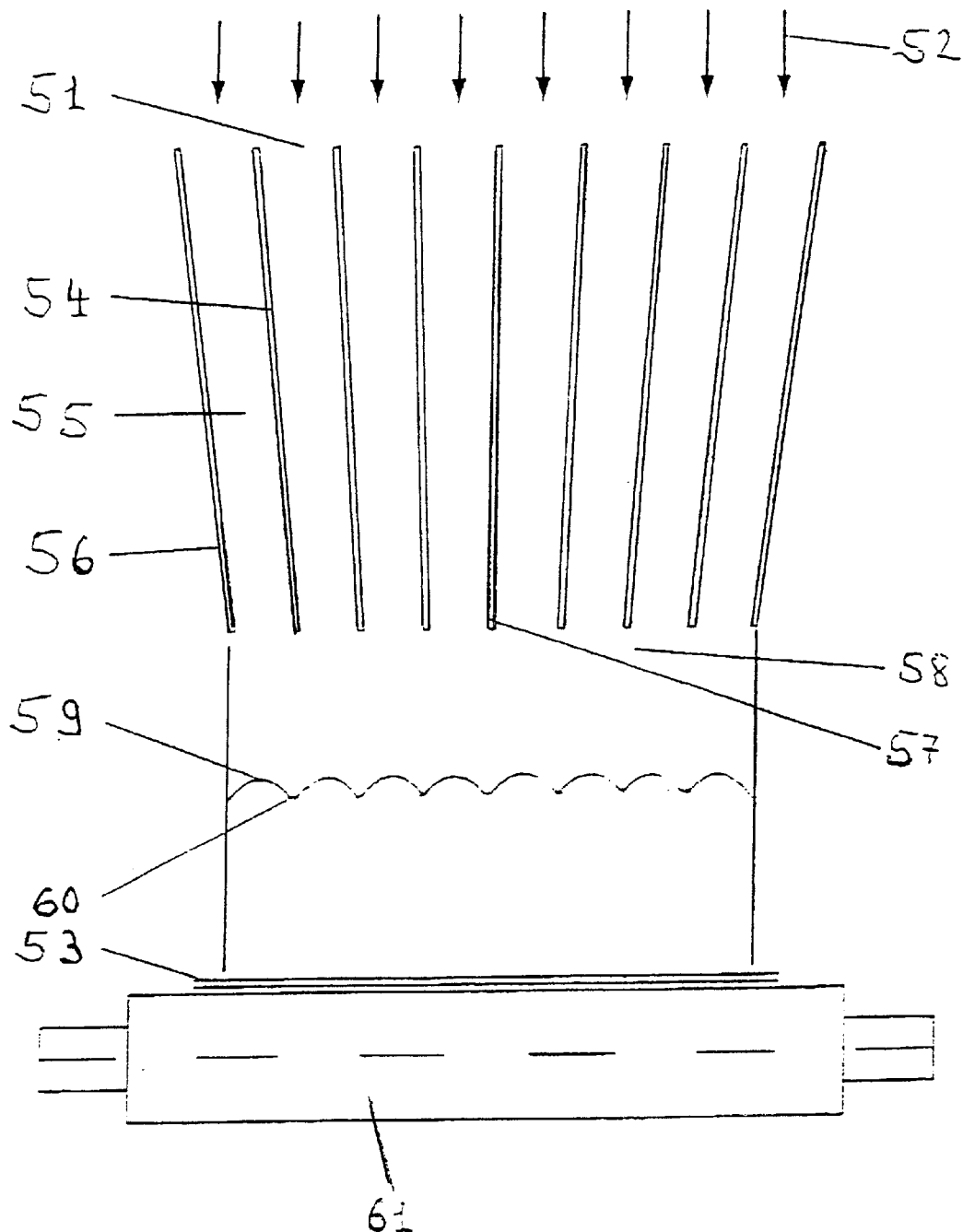
FIG. 8: a sectional view of a schematically illustrated compartmentalized chute with guide plates that are oriented straight in the transport or belt running direction.

In FIG. 8 of the drawing, a compartmentalized chute 51 with guide plates oriented straight in the transport or belt running direction in illustrated schematically as a sectional view. Therein, the upper arrows schematically represent the material feed location 52 out of the dosing hopper which is not shown, while a forming belt 53 with a driver 61 is located as a transport or conveyor apparatus under the compartmentalized chute 51. The compartmentalized chute 51 is width adjustable, and essentially consists of plural guide plates 54 that are adjustable transversely relative to the vertical, and that all extend straight in the transport or belt running direction. The guide plates 54 are pivotably suspended at the upper area, so that they are adjustable singly or in groups transversely relative to the vertical. In longer compartmentalized chutes 51, the guide plates 54 can also be connected by plural bearing points with a fixed-location housing or frame component. The guide plates 54 can also be laterally slidably arranged, in order to change the spacing distances therebetween in a step-less manner or in prescribable steps.

The illustrated compartmentalized chute 51, nine guide plates 54 are provided. In practice, transport or conveyor widths of approx. 3 to 4 meters with nine to thirty guide plates 54 have been shown to be advantageous. The illustrated compartmentalized chute 51 is conceived and designed in such a manner so that all of the guide plates 54, 56, 57 are oriented parallel to each other at maximum transport or conveying width, so that the total or entire material flow is divided into approximately eight equally large partial flows 55. Since in practice spreading width variations of up to approx. 30% can be necessary, the two edge guide plates 56 must be adjustable inwardly. Therefore, both guide plate groups on opposite sides of the middle guide plate 57 are pivotably relative to the middle guide plate 57, in order to adjust the transport or conveying width corresponding to the desired panel width symmetrically relative to the belt middle. Thereby, it has been shown in practice to be advantageous, that all guide plates 54, 56 are pivoted or slidingly displaced in such a manner so that equal spacing distances of the guide plates 54, 56, 57 relative to each other arise at the material outlet location 58, in order to achieve a relatively equal material distribution over the entire width. By means of such a width adjustment, a material distribution is achieved on the forming belt 53, which includes slight material accumulations 59 in the middle of the partial flows 55, and slight depressions 60 under the guide plates 54, 56, 57.

Figure 9:
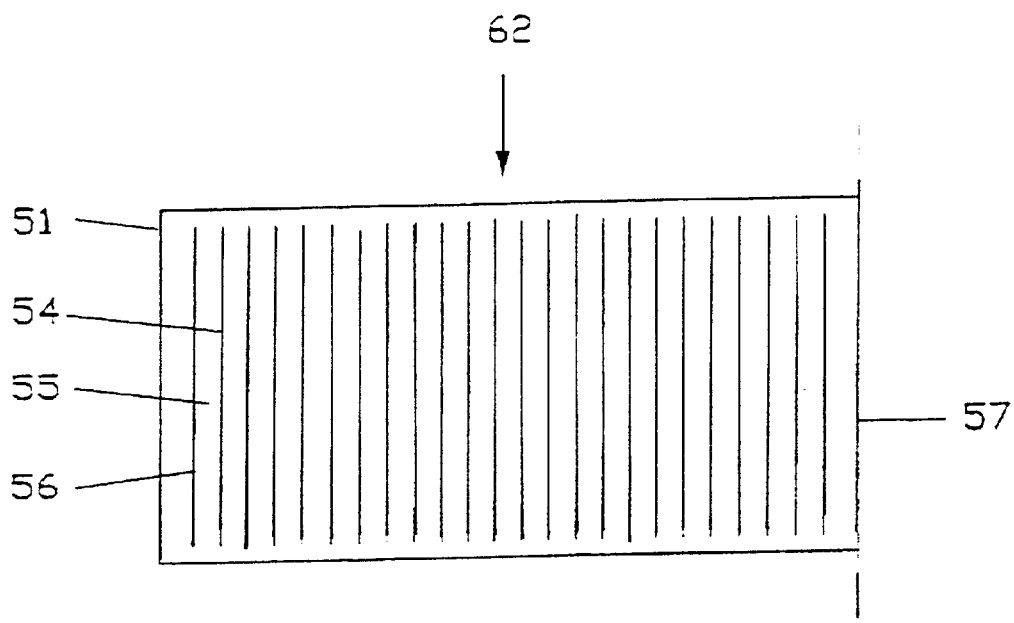
FIG. 9: a plan view onto the guide plates of the compartmentalized chute as seen from above.

In the invention embodiment of the compartmentalized chute 51, the protrusions 59 and depressions 60 are equalized by an inclined or sloping setting of the guide plates 54, 56, 57 or of guide plate groups at the outlet end 58 of the compartmentalized chute 51. This inventive arrangement of the guide plates 54, 56, 57 can be seen schematically from FIGS. 9 and 10 of the drawing. In FIG. 9 of the drawing, the plan view onto the guide plates 54, 57 of the compartmentalized chute according to FIG. 8 is shown as seen from above, and particularly only one half of the compartmentalized chute 51, which is embodied in a mirror-symmetrical manner. The illustrated compartmentalized chute half has a width of about 150 cm, whereby the guide plates 54, 56, 57 are arranged at a spacing distance of approx. 10 cm from one another. This compartmentalized chute 51 is suitable for panel widths up to approx. 300 cm. All of the guide plates 54, 56, 57 are oriented in the transport or belt running direction 62, so that the spread glued chips or fibers are divided into parallel partial flows 55 and then come downwardly onto the forming belt 53 due to the effect of gravity. In order to prevent the accumulation 59 in the middle, and the depressions 60 on the edges of the partial flows 55 in the form of an asparagus field on the forming belt, the partial flows 55 are partially laterally deflected by the guide plates 54, 56, 57 of the compartmentalized chute 51, so that the accumulations 59 overlap with the depression 60, so that a planar uniform spreading onto the forming belt 53 arises.

Figure 10:
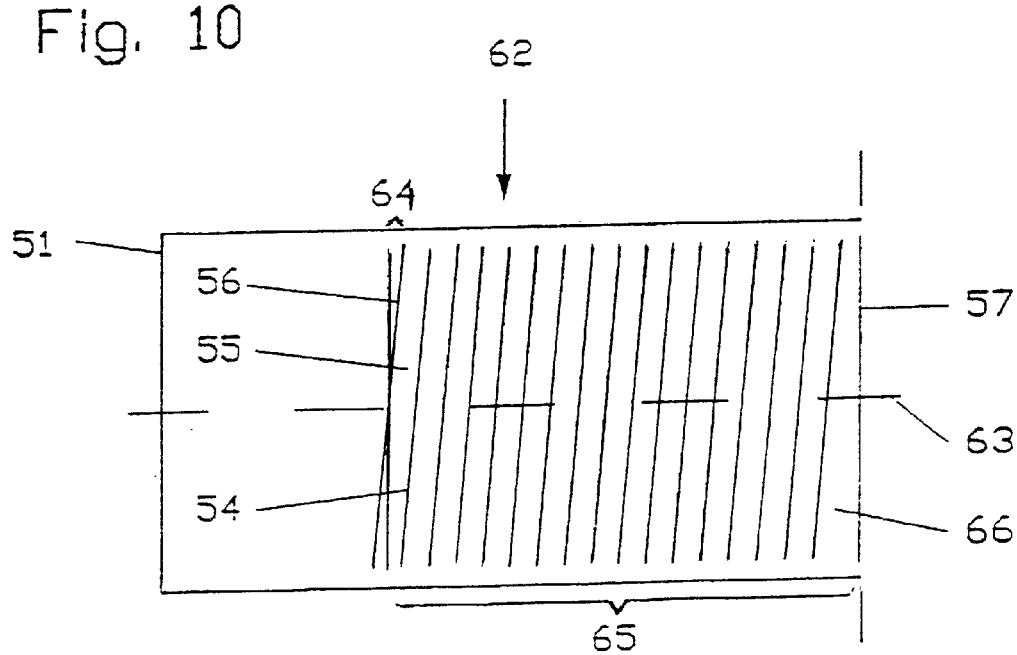
FIG. 10: a plan view onto the guide plates of the compartmentalized chute as seen from below.

This lateral deflection of the partial flows 55 is schematically shown in FIG. 10 of the drawing, which shows the outlet area 58 of the inventive embodiment of the compartmentalized chute 51. Simultaneously in FIG. 10 of the drawing, a width adjustment of about 25% is shown at the material outlet location 58, so that the outlet width of the compartmentalized shaft 51 now only amounts to approx. 220 cm or 110 cm per illustrated half of the compartmentalized chute. Therein, the guide plates 54, 56, 57 are arranged offset at an incline or laterally relative to the transport or belt running direction 62, whereby in practice a lateral offset or shifting of about the width of a partial flow 55 has been found to be advantageous.

Such an inclined position or lateral shifted offset can be easily achieved in that the spreading width of the compartmentalized chute 51 is adjusted narrower in the rear than in the front in the transport direction 62. The width adjustment is carried out in an advantageous manner always symmetrically relative to the middle guide plate 57, so that a uniform spreading is achievable also for smaller spreading widths. In the illustrated inclined positioning of the guide plates 54, 56 relative to the transport direction 62, the guide plates 54, 56 of one compartmentalized chute half are pivotably displaced by a half division spacing 64 relative to a middle surface 63. Thereby, the compartmentalized chute 51 is adjusted to be somewhat wider in the front and somewhat narrower in the rear, relative to a medium or average width 65 at the middle surface 63, in the transport direction 62. Thereby, basically all of the partial flows 55 remain equally wide, but simply relative to the middle guide plate 57 there arises a differing width of the partial flow 66 at that location. It is, however, also possible, to adjust the compartmentalized chute 51 to be narrower only in the rear, so that all of the partial flows 55, 66 extend somewhat narrower toward the rear, whereby, however the lateral shift or offset relative to the middle guide plate 57 becomes smaller.

In practice, in connection with the spreading of fiber panels, guide plates 54, 56, 57 which are approx. 150 cm long in the vertical direction and approx. 100 cm wide in the transport or belt running direction 62 have been proven to be useful for achieving a good guidance. In this context, the guide plates 54, 56, 57 are terminated at an incline relative to a horizontal plane toward the forming belt at the material outlet end 58, whereby the incline of the guide plates 54, 56, 57 is embodied to fall off in the transport direction 62, so that a long guide path distance is available especially in the rear laterally shifted or offset area. The inclined edge angle of the individual guide plates 54, 56, 57 can also be different from one another, in order to provide only a short guide path distance especially for the middle guide plates 57, in order to compensate for differing or varying inclined orientations at that location by short guide path distances.

In FIG. 8 of the drawing, a width-adjustable compartmentalized chute is illustrated, in which all of the guide plates 54, 56, 57 are pivoted or slidingly displaced in such a manner so that the guide plates 54, 56, 57 comprise equal spacing distances relative to one another at the material outlet location 58, in order to achieve a relatively equal material distribution over the entire width. Through such a width adjustment, a uniform material distribution is achieved on the forming belt 53, which leads to a continuous panel quality over the entire width. In order to achieve a symmetrical width adjustment relative to the middle guide plate 57, the individual guide plates 54, 56 of each compartmentalized chute half must be adjusted at the bottom by various different lateral sliding displacement path distances. In an automatic width adjustment, in connection with a prescribed total width at the material outlet location 58, each guide plate 54, 56 must be laterally slidingly displaced or pivotingly displaced so far so that an approximately equal spacing distance is established between the individual guide plates 54, 56.

Figure 11:
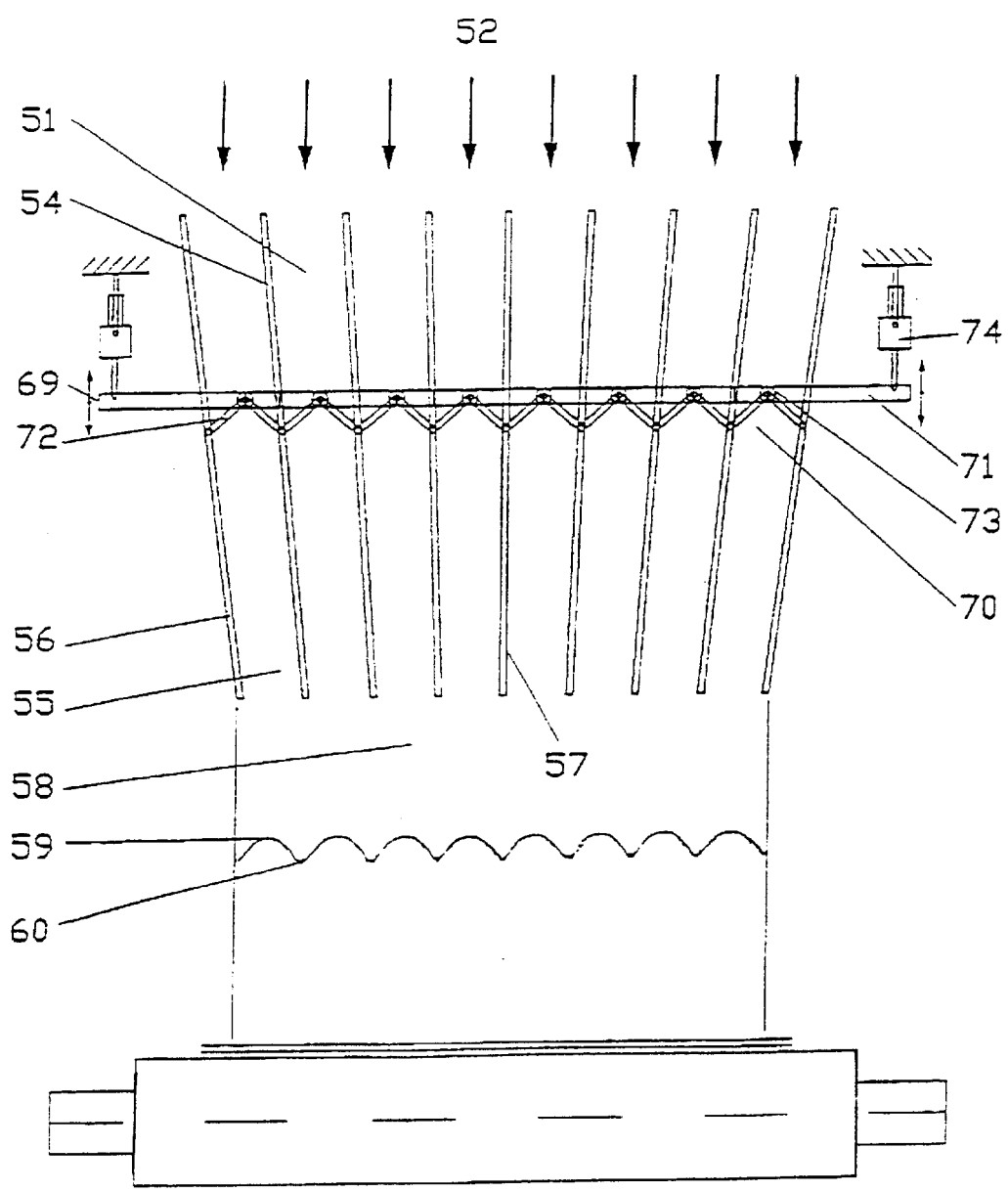
FIG. 11: a schematic compartmentalized chute with a width adjustment via a knee-lever or bellcrank toggle lever linkage.

In FIG. 11 of the drawing, such an automatic width adjustment apparatus is schematically illustrated. The individual guide plates 54, 56, 57 are pivotably suspended in the area of the material feed location 52, and are connected with one another in the lower third portion by means of the width adjustment apparatus 69, which is embodied as a joined or articulated lever apparatus. The articulated lever apparatus 69 essentially consists of eight knee lever or bellcrank toggle lever joints 70 arranged between the separating plates 54, 56, 57, and an adjusting lever mechanism 71. The bellcrank toggle lever joints 70 are formed of two equally long joint arms 72, which are secured with one joint arm end respectively to one guide plate 54, 56, and which are connected with the other end in a jointed or articulated manner to a running roller 73. Thereby the individual joint arms 72 have at least a length that corresponds to half of the spacing distance of the maximum spacing distance between the guide plates 54, 56, 57. All of the guide plates 54, 56, 57 are mechanically coupled with one another through the jointed connection of the bellcrank toggle joints 70 with the guide plates 54, 56, 57.

To uniformalize the width adjustment of the compartmentalized chute 51, the same bellcrank toggle joints 70 are installed also on the opposite side as seen in the transport or belt running direction. The running rollers 73 arranged between the joint arms 72 are arranged in a slotted U-profile pipe, which represents the adjustment mechanism 71. The U-profile pipe 71 is arranged horizontally and transversely relative to the transport or belt running direction respectively at the beginning and at the end of the compartmentalized chute 51. For the width adjustment of the compartmentalized chute 51, the U-profile pipe 71 is provided at each end with a vertical drive 74 which is not shown in further detail, and by means of which the adjustment mechanism 71 is vertically adjustable in both directions with a linear motion. The vertical drive 74 can be embodied as a draw spindle drive, as a hydraulic or pneumatic pressure medium cylinder, or in another form of a linear drive.

Figure 12:
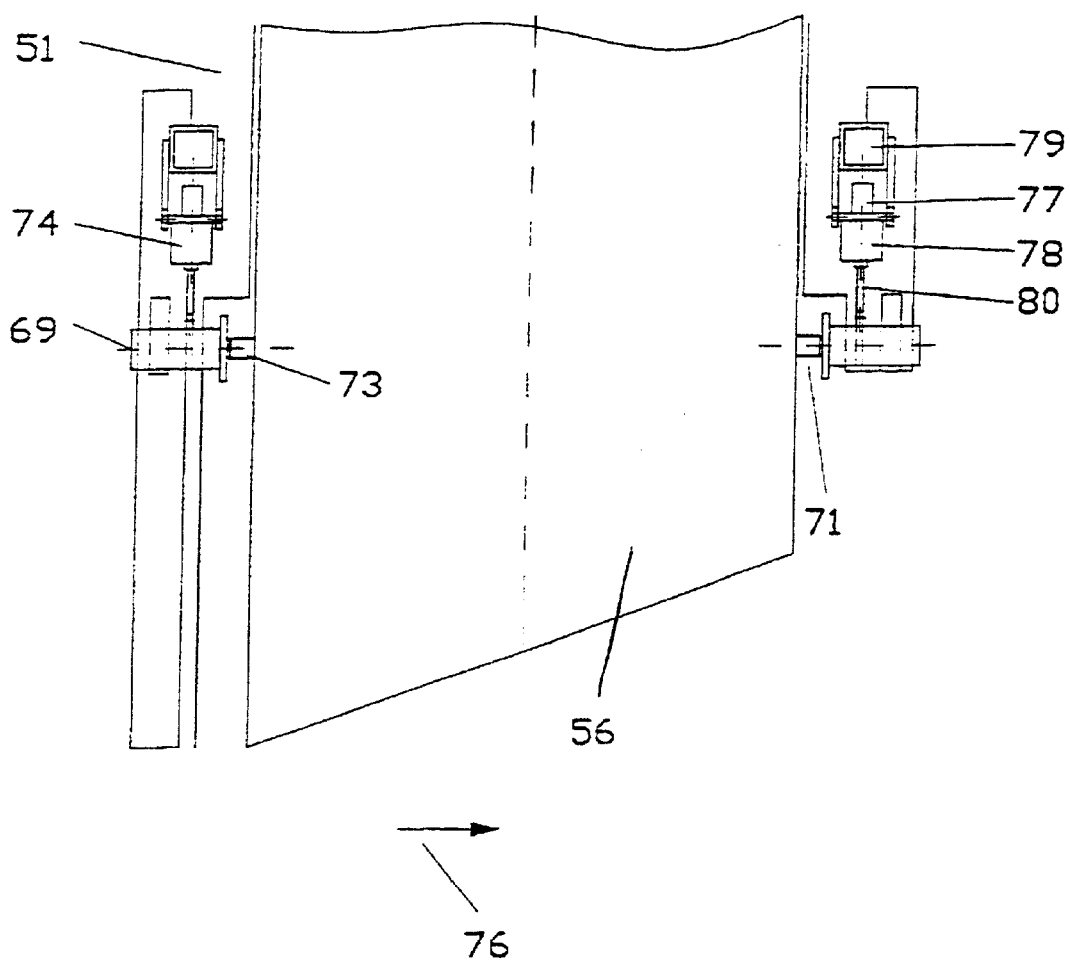
FIG. 12: a compartmentalized chute in a side view with a height adjustable bellcrank toggle lever linkage.

In FIG. 12 of the drawing, there is illustrated the side view of the guide plates 54, 56, 57 which are arranged in the transport or belt running direction 76, with two draw spindle drives 74. In this context, a width adjustment apparatus 69 of similar type is respectively arranged in the front and in the back, whereby these width adjustment apparatus 69 respectively possess respective draw spindle drives 77. The drive motors 78 are respectively secured in an articulated manner on a locationally fixed crosswise or transverse spar 79. The draw spindle 80, which is vertically adjustable or positionable in the transmission drive motor 78, is articulately suspended on a flange, on which the horizontal U-profile pipe 71 is arranged. Advantageously, the entire adjustment apparatus 69 is provided in the front and in the back with respectively two draw spindle drives 77, so that a uniform, interference-free height adjustment is ensured.

If now the compartmentalized chute 51 is to be automatically adjusted to a narrower spreading width, as this is shown in FIG. 11 of the drawing, then the draw spindle drives 77 must uniformly move the two U-profile pipes 71 upwardly. Thereby, the spacing distance between all of the guide plates 54, 56, 57 is automatically uniformly reduced, although the lateral adjustment path distance for the outer guide plates 56 is larger than for the inner guide plates 54.

With a uniform height adjustment both in the front as well as in the back, equally wide and narrower partial flows 55 will automatically be formed, whereby all of the guide plates 54, 56 will move parallel to the transport direction 76 and symmetrically relative to the middle or rather the middle guide plate 57, and only the middle guide plate 57 will remain in its position.

With such a width adjustment 69, the guide plates 54, 56, 57 can be adjusted so far so that partial flows 55 that are essentially as narrow as may be desired will be formed at the material outlet location 58. Since fiber panels are advantageously spread with such a compartmentalized chute 51, in practice a width adjustment of at most approx. 30% will be necessary. Moreover the partial flows 55 shall not taper downwardly to too sharp an angle, because otherwise it would result in material jams or blockages. For this reason, guide plate lengths of approx. 1.5 to 2 m are provided.

For a special control of the compartmentalized chute 51, the width adjustment apparatus 69 can also be embodied in such a manner so that the four vertical drives 74 are also individually controllable. Hereby, it is, for example possible to adjust the guide plates 54, 56, 57 to a larger spacing distance in the front and a smaller spacing distance in the rear, relative to each other. In this manner, the guide plates 54, 56, 57 are laterally displaced relative to the transport direction 76, so that they are then arranged at an incline or slope in the transported flow. Since the middle guide plate 57 remains unchanged in the transport direction 76, a symmetrical inclined orientation relative to the middle of the compartmentalized chute will arise.

The vertical drives 74 may, for example, also be controlled in such a manner so that the U-profile pipe 71 is adjustable to be inclined or sloped in the horizontal so that different spacing distances between the guide plates 54, 56, 57 will result both in the front as well as in the back, so that therewith the inclined orientation of the guide plates 54, 56, 57 in the transport flow is simultaneously also influenceable. In this context, the inclined orientation can be selected in such a manner that the protuberances 59 and depressions 60 of the partial flows 55 overlap in the transport direction 76 in such a manner so that a very homogeneous uniform spread surface is achievable. The adjustment mechanism 71 can also be embodied so that it is divided in the area of the middle guide plate 57. Thereby, each part of the adjustment mechanism 71 as well as the entirety can be vertically adjusted or also can be articulately or jointedly secured in the middle in order to embody it to be pivotable about this point.

Figure 13:
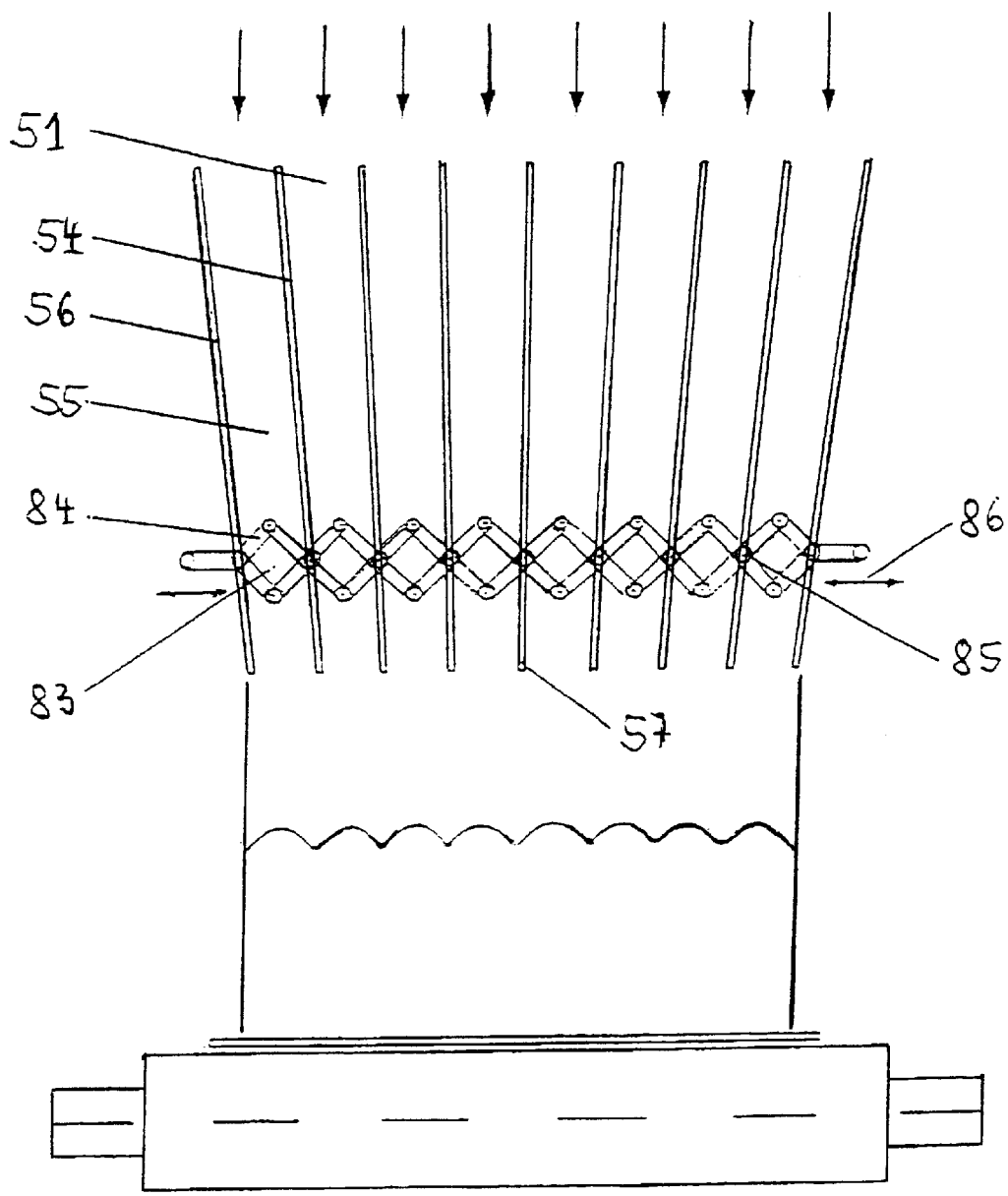
FIG. 13: a schematic compartmentalized chute with a width adjustment by a scissors truss linkage.

In FIG. 13 of the drawing, a further example embodiment of a width adjustment on a compartmentalized chute 51 according to FIG. 8 is illustrated. In connection with this width adjustment, a uniform spacing distance change of the guide plates 54, 56, 57 relative to each other is achieved by means of a so-called scissors grid or scissors truss linkage 83 as an articulated lever apparatus, of which the change or variation is achievable through a horizontal linear movement 86. For this purpose, at least eighteen adjustment levers 84 are articulately connected with each other in the form of a scissors truss and are additionally articulately secured to a guide plate 54, 56, 57 at the crossing points 85. By means of a horizontal linear drive, such as a draw spindle drive 77 or the like, for example, the spacing distance between the guide plates 54, 56, 57 can be uniformly varied or changed. If the width of the compartmentalized chute 51 is to be variable or changeable symmetrically relative to the middle guide plate 57, then the drive 77 must also be carried out symmetrically relative to the middle guide plate 57. For example, a separate linear drive 77 could be provided on each edge guide plate 57, whereby each one of these separate linear drives 77 effects a synchronous horizontal movement 86 inwardly or outwardly. Such a scissors truss linkage 83 would be advantageously provided on the compartmentalized chute 51 both in the front as well as in the rear in the transport direction 76, whereby a uniform width adjustment would be achievable with a synchronous control of the linear drives 77. A scissors truss linkage 83 of this type can also be embodied in such a manner so that it is pivotable as a whole or about a rotation point, relative to a horizontal line. Thereby, differing adjustment path distances between the guide plates 54, 56, 57 are then possible. By means of a further differing width adjustment of the guide plates 54, 56 in the front and in the rear, an inclined orientation of the guide plates 54, 56 relative to the transport direction 76 can also be achieved, whereby a smoothing of the spread surface is achievable.

Figure 14:
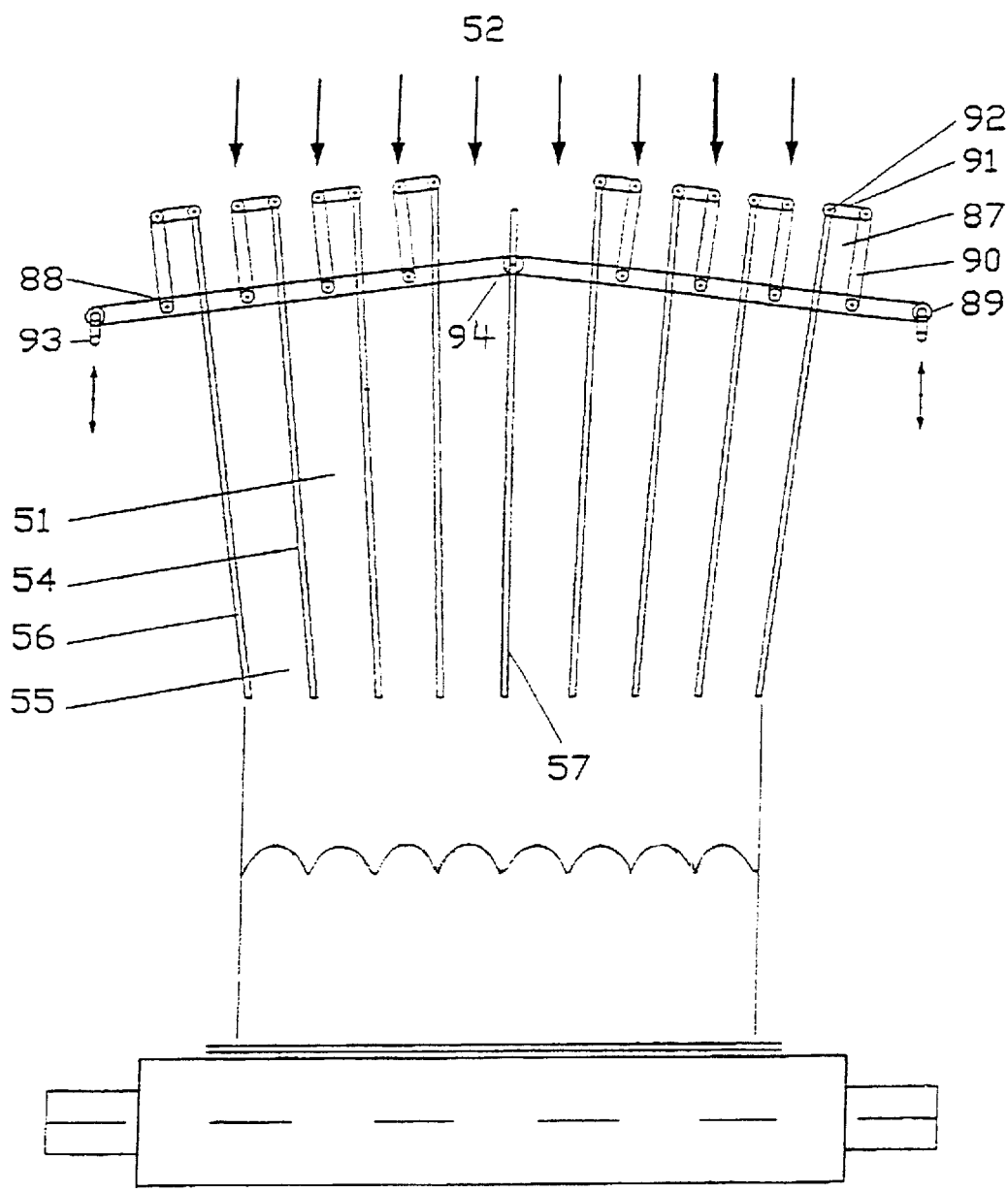
FIG. 14: a schematic compartmentalized chute with a width adjustment via an articulated or jointed lever linkage.

In FIG. 14 of the drawing, a further example embodiment of an automatic width adjustment of a compartmentalized chute 51 according to FIG. 8 is illustrated. Therein, the guide plates 54, 56, 57 but for the middle guide plate 57 are rotatably supported at the top in the area of the material feed location 52. The width adjustment apparatus is embodied as an articulated lever apparatus, and is arranged in the upper area of the compartmentalized chute 51, and achieves a pivoting of the individual guide plates 54, 56 relative to a vertical orientation. The articulated lever apparatus essentially consists of two parts which are arranged symmetrically relative to the middle guide plate 57 and which respectively include four articulated or jointed lever connections 87, which are articulately secured to a common adjusting lever 89, and represent an articulated or jointed lever arrangement 88. The articulated or jointed lever connections 87 respectively consist of a lever arm 91 oriented approximately horizontally and a lever arm 90 oriented approximately vertically. The horizontal lever arm 91 is connected rigidly at one end with the rotation point 92 of the guide plates 54, 56, and is connected articulately with the other end to the vertical lever arm 90. The vertical lever arm 90 is articulately arranged with its lower end on the common adjusting lever 89. The adjusting lever 89 is essentially horizontally oriented and rotatably supported in the area of the middle guide plate 57. At the other ends, the adjusting levers 89 are connected with a drive 93 which is not shown in detail and which generates a linear movement, and by means of the adjusting levers the guide plates 54, 56 can be laterally pivotally displaced relative to the vertical orientation.

If the adjusting levers 89 are moved downwardly about a common rotation point 94, then a rotational moment will be exerted through the articulated or jointed lever connections 87 about the suspensions of the guide plates 54, 56, so that all of them but for the middle guide plate 57 are pivoted inwardly. Hereby, the spreading width of the compartmentalized chute 51 is adjusted to a narrower spreading width. Since all of the articulated or jointed lever connections 87 have the same jointed lever lengths, a different pivoting displacement of the guide plates 54, 56 will result, which becomes larger with the distance from the common rotation point 94. Thereby, the outer guide plates 56 will be automatically laterally pivoted farther than the inner guide plates 54, so that with a synchronous movement of the drives 93, the horizontal spacing distances between all of the guide plates 54, 56, 57 will remain constantly equal, so that all partial flows 55 become continuously narrower. However, the drives 93 at the beginning and the end of the compartmentalized chute 51 can also be controlled with different pivoting paths, so that an inclined position of the guide plates 54, 56 relative to the transport direction 76 results. It is also conceivable, that each compartmentalized chute half will be separately actuated, in order to even-out any possible transport or conveying differences in the partial flows or surface unevennesses. Especially in connection with the spreading of fiber panels, by means of the individual control of the drives 93, not only can the width be automatically changed, but also the surface waviness can be substantially avoided.

For an individual control of each adjusting lever 89, four drives 93 are necessary, whereby each compartmentalized chute half is automatically adjustable in width, both in the front as well as in the rear, and therewith also the guide plate position or orientation relative to the transport direction 76 is adjustable. By means of the width adjustment of the compartmentalized chute 51 with such articulated or jointed lever arrangements 88, compartmentalized chutes 51 with up to thirty guide plates 54, 56, 57 are adjustable in common in the width and the position or orientation relative to the transport direction 76, in a simple manner with few linear drives 93. Thereby, the adjustment can be carried out automatically also during the spreading process, without having had to interrupt the panel production process.

What is claimed is:

1. Forming station comprising:
    a spreading apparatus,
    a forming belt,
    a dosing hopper out of which a transport flow of flowable materials including chip and fiber-form materials is delivered in a transport direction to the spreading apparatus, through which a material fleece of the flowable materials is spreadable onto the forming belt, and
    a compartmentalized chute (2, 51) arranged vertically and longitudinally in the transport flow between the dosing hopper (1) and the forming belt (4, 53),
    wherein the compartmentalized chute comprises plural guide plates (9, 39, 40, 41, 54, 56, 57) which are arranged next to one another in the transport direction (36) and are all respectively spaced apart from one another by spacing distances in a transverse direction that extends transversely relative to a longitudinal conveying direction of the forming belt, so as to form a respective compartment channel between each two adjacent ones of the guide plates, thereby dividing the transport flow in the transport direction (36, 62, 76) into plural side-by-side partial flows (38, 55, 56) respectively in the respective compartment channels.

2. Forming station according to claim 1, characterized in that the spacing distances of the guide plates (9, 39, 40, 41, 54, 56, 57) from one another and/or from a vertical orientation are adjustable, whereby the transport flow is laterally deflectable and/or adjustable in width.

3. Forming station according to claim 1, characterized in that the compartmentalized chute (2, 51) is arranged directly between the dosing hopper (1) and the forming belt (4, 53), or the dosing hopper (1) and an additional conveying apparatus (23), and/or the conveying apparatus (23) and a spreading head (3, 24) of the spreading apparatus, or the dosing hopper (1) and the spreading head (3, 24).

4. Forming station according to claim 3, characterized in that the additional conveying apparatus (23) or a floor belt (6) of the dosing hopper (1) is embodied as a dosing belt scale (21, 23) through which a feedable material quantity of the flowable material is regulatable.

5. Forming station according to claim 1, characterized in that the compartmentalized chute (2, 51) includes at least four of the guide plates (9, 39, 40, 41, 54, 56, 57), whereby two of the guide plates serve as side boundaries (39, 40, 56).

6. Forming station according to claim 1, characterized in that the guide plates (9, 39, 40, 41, 54, 56, 57) are pivotably or slidably supported, whereby these are pivotable and/or slidable transversely relative to the transport direction (36, 62, 76) at least at one bearing point (37, 92).

7. Forming station according to claim 1, characterized in that the guide plates (9, 39, 40, 41, 54, 56, 57) are controllable individually or in groups, whereby these are movable individually or groupwise continuously, discontinuously, or step-wise toward one another or apart from one another.

8. Forming station according to claim 1, characterized in that the guide plates (9, 39, 40, 41, 54, 56, 57) are embodied as flat straight metal sheets or are structured in a wavy or sawtooth-like manner transversely relative to the transport direction (36).

9. Forming station according to claim 1, characterized in that the guide plates (9, 39, 40, 41, 54, 56, 57) are embodied rectangularly or quadratically, or have edges that rise on an incline in the transport direction (14) or contrary to the transport direction (14) in a feed area (12, 52) and/or a discharge area (13, 15, 58), whereby the edges extend straight, curved, wave-shaped or sawtooth-shaped.

10. Forming station according to claim 1, characterized in that the guide plates (9, 39, 40, 41, 54, 56, 57) are equally or differently long, and/or the edges (12, 13, 15) in the feed area and/or the discharge area are embodied the same or differently.

11. Forming station according to claim 1, characterized in that the guide plates (9, 39, 40, 41, 54, 56, 57) consist of metal, plastic, or composite materials, whereby the surfaces thereof are protected against corrosion and/or abrasive wear and/or adhesion.

12. Forming station according to claim 1, characterized in that individual ones or all of the guide plates (9, 39, 40, 41) are coupled with a vibration generator, by means of which the guide plates (9, 39, 40, 41, 54, 56, 57) are set into vibration transversely relative to the transport direction (36).

13. Forming station according to claim 1, characterized in that the guide plates (9, 39, 40, 41, 54, 56, 57) are embodied in plural individual parts in the transport direction (36), whereby the individual parts are adjustable relative to each other in a length and/or in a lateral orientation thereof.

14. Forming station according to claim 1, characterized in that the guide plates (9, 39, 40, 41, 54, 56, 57) are embodied to be flexible at least in the transport direction (36), whereby the guide plates are arranged to be laterally adjustable in whole or in sections.

15. Forming station according to claim 1, characterized in that the compartmentalized chute (2, 51) and/or an additional conveyor apparatus (23) and/or the spreading apparatus (3, 24) are adjustable in a horizontal direction (16) upwardly and/or downwardly.

16. Forming station according to claim 1, characterized in that at least one of the compartmentalized chute (2, 51), the conveyor apparatus (23), and the spreading apparatus (3, 24) is adjustable in at least one of a transport width and a spreading width by 30% of a maximum of the transport width or the spreading width.

17. Forming station according to claim 1, characterized in that the spreading apparatus has a spreading head (3, 24) that includes spreading rollers (30) arranged transversely relative to the transport direction (14).

18. Forming station according to claim 1, characterized in that the guide plates (54, 56, 57) arranged next to one another or at least groups of the guide plates (54, 56) are arranged sloping at an incline relative to the transport direction (62, 76) at least at a bottom at a material outlet location (58).

19. Forming station according to claim 1, characterized in that the spacing distances of the guide plates (54, 56, 57) from one another and/or transversely relative to a vertical orientation are adjustable, whereby the transport flow is laterally deflectable and/or adjustable in width, whereby at least the guide plates (57) in a middle of the compartmentalized chute (51) comprise larger spacing distances from each other toward a front in comparison to a rear in the transport direction (62, 76) at a material outlet location (58).

20. Forming station according to claim 1, characterized in that the guide plates (54, 56, 57) are equally or differently long, and the guide plates (54, 56, 57) extend slopingly at an incline in the transport direction (62, 76) relative to a horizontal plane at least at a material outlet location (58).

21. Forming station according to claim 1, characterized in that all or at least groups of the guide plates (54, 56, 57) arranged next to one another are connected to each other by an articulated lever apparatus (69, 88, 83) in such a manner so that the width and/or the lateral orientation of the partial flows (55, 66) is automatically adjustable by the effect of a linear movement (74, 86, 93) on the lever apparatus (69, 83, 88).

22. Forming station according to claim 20, characterized in that the articulated lever apparatus includes at least two articulately connected levers (72, 84, 91, 90) provided on each adjustable guide plate (54, 56), wherein an angular orientation of the levers relative to each other is changeable by the effect of the linear movement (74, 86, 93).

23. Forming station according to claim 21, characterized in that the articulated lever apparatus (69, 83, 88) is embodied as a bellcrank toggle lever arrangement (69, 70), as a scissors truss arrangement (83), or as a jointed lever arrangement (88).

24. Forming station according to claim 23, characterized in that the bellcrank toggle lever arrangement (69, 70) consists of equally-long bellcrank toggle lever joints (70) arranged between all adjustable guide plates (54, 56, 57), on respective joint points of which a one-part or multi-part adjusting lever arm (71) engages, by means of which the angles of the bellcrank toggle lever joints (70) are changeable.

25. Forming station according to claim 23, characterized in that the scissors truss arrangement (83) consists of plural equally-long parallelogram-like connected joint levers or adjusting levers (84), respective crossing points (85) of which are articulately coupled with the adjustable guide plates (54, 56, 57), whereby the angles between the crossing points are changeable by means of a linear applied force effect or movement effect.

26. Forming station according to claim 21, characterized in that the articulated lever apparatus (88) includes several articulated lever connections (87), which each respectively consist of a horizontal lever arm and a vertical lever arm that are articulately connected with each other for each adjustable guide plate (54, 56, 57), and which form an angle relative to each other, whereby the horizontal lever arm (91) is rigidly connected with a rotation point (92) of the respective adjustable guide plate (54, 56, 57) and the vertical lever arm (90) is articulately connected with a one- or two-part adjusting lever (89), and the adjusting lever (89) is pivotably supported about a rotation point (94), whereby the adjustable guide plates (54, 56, 57) are adjustable relative to the vertical.

27. Forming station according to claim 1, further comprising an articulated lever apparatus (69, 83, 88) with at least one linear drive (74, 77, 86, 93) respectively provided in the transport direction (76) in a front and in a rear on the compartmentalized chute (51).

28. Forming station according to claim 27, characterized in that the at least one linear drive (74, 86, 93) is selected from the group consisting of tension spindle drives (77), hydraulic drives, pneumatic drives, and gear rack drives.

29. Forming station according to claim 1, having a total number n of the guide plates, and a total number n–1 of the compartment channels formed respectively between adjacent pairs of the guide plates.

30. Forming station according to claim 1, wherein each one of the guide plates extends along a respective plane that is parallel to the longitudinal conveying direction of the forming belt.

* * * * *

UNITED STATES PATENT AND TRADEMARK OFFICE
CERTIFICATE OF CORRECTION

PATENT NO. : 6,695,605 B1
DATED : February 24, 2004
INVENTOR(S) : Wirthel et al.

It is certified that error appears in the above-identified patent and that said Letters Patent is hereby corrected as shown below:

Column 1,
Line 6, replace "panel." by -- panels. --.

Column 3,
Line 62, after "cellulose-containing", replace "particle" by -- particles --.

Column 5,
Line 55, after "or", replace "met 5" by -- mat 5 --.

Column 10,
Line 15, before "illustrated", replace "The" by -- In the --.

Column 12,
Line 11, after "a", replace "joined" by -- jointed --.

Column 17,
Line 25, before "characterized", replace "claim 20," by -- claim 21, --.

Signed and Sealed this

Eighteenth Day of May, 2004

JON W. DUDAS
*Acting Director of the United States Patent and Trademark Office*